(12) United States Patent
Walther

(10) Patent No.: US 9,086,088 B2
(45) Date of Patent: Jul. 21, 2015

(54) SCREW HAVING UNDERSIDE CUTTERS AND POCKETS

(75) Inventor: Mirco Walther, Thunder Bay (CA)

(73) Assignee: ILLINOIS TOOL WORKS INC., Glenview, IL (US)

( * ) Notice: Subject to any disclaimer, the term of this patent is extended or adjusted under 35 U.S.C. 154(b) by 123 days.

(21) Appl. No.: 13/440,008

(22) Filed: Apr. 5, 2012

(65) Prior Publication Data

US 2012/0186067 A1     Jul. 26, 2012

Related U.S. Application Data

(62) Division of application No. 12/561,931, filed on Sep. 17, 2009, now abandoned.

(51) Int. Cl.
F16B 35/06        (2006.01)

(52) U.S. Cl.
CPC ......... *F16B 35/065* (2013.01); *Y10T 29/49947* (2015.01)

(58) Field of Classification Search
CPC .................................................. F16B 35/065
USPC .......... 29/456, 525.11, 525.01; 411/399, 187, 411/18
See application file for complete search history.

(56) References Cited

U.S. PATENT DOCUMENTS

| 493,585 | A | 3/1893 | Norman |
|---|---|---|---|
| 586,232 | A | 7/1897 | English |
| 844,750 | A | 2/1907 | Rieschick |
| 1,406,423 | A | 2/1922 | Smith |
| 1,527,831 | A | 2/1925 | Borgner |
| 1,923,647 | A | 8/1933 | Vera |
| 2,037,586 | A | * 4/1936 | Olson ........................... 411/188 |
| 2,112,494 | A | 3/1938 | Olson |
| 2,833,326 | A | 5/1958 | Knohl |
| 2,959,204 | A | 11/1960 | Rigot |
| 2,982,166 | A | 5/1961 | Hobbs |
| 3,127,919 | A | 4/1964 | Arent |

(Continued)

FOREIGN PATENT DOCUMENTS

| CA | 2198832 | 9/1997 |
|---|---|---|
| CA | 2537525 | 3/2005 |

(Continued)

OTHER PUBLICATIONS

International Preliminary Report on Patentability for PCT/CA2010/000838 dated Nov. 10, 2011.

(Continued)

*Primary Examiner* — David Bryant
*Assistant Examiner* — Steven A Maynard
(74) *Attorney, Agent, or Firm* — Snell & Wilmer L.L.P.

(57) ABSTRACT

A screw has a generally flat washer-like head. On an underside of the head are a plurality of cutters or cutting wedges arranged circumferentially around the shank of the screw. The cutters cut or carve off material when the screw is inserted into a fibrous material like wood to thereby facilitate countersinking of the screw head. The cutters may be triangular or quadrilateral wedges. One or more pockets are disposed radially inwardly of the cutters for receiving fibrous material to help lock the screw in place, i.e. to prevent the screw from loosening over time. These pockets may circularly shaped pockets disposed circumferentially around the shank. Alternatively, a single annular pocket may be provided around the shank.

12 Claims, 3 Drawing Sheets

(56) References Cited

U.S. PATENT DOCUMENTS

| | | | |
|---|---|---|---|
| 3,286,579 | A | 11/1966 | Lovisek |
| 3,358,727 | A * | 12/1967 | Hughes .................. 411/180 |
| 3,370,631 | A | 2/1968 | James |
| 3,389,734 | A | 6/1968 | Gutshall |
| 3,438,417 | A | 4/1969 | Albris |
| 3,903,784 | A | 9/1975 | Dekker |
| 4,094,352 | A | 6/1978 | Hlinsky |
| 4,220,188 | A | 9/1980 | McMurray |
| 4,310,272 | A | 1/1982 | Rich et al. |
| 4,470,736 | A | 9/1984 | Tasseron |
| 4,637,766 | A | 1/1987 | Milliser |
| 4,812,095 | A | 3/1989 | Piacenti et al. |
| 4,820,235 | A | 4/1989 | Weber et al. |
| 4,966,512 | A | 10/1990 | Takaku |
| 5,183,359 | A | 2/1993 | Barth |
| 5,249,882 | A | 10/1993 | Nagoshi et al. |
| D368,019 | S | 3/1996 | Ohtsuka |
| 5,509,766 | A | 4/1996 | Leuschner |
| 5,564,873 | A | 10/1996 | Ladouceur et al. |
| 5,622,464 | A | 4/1997 | Dill et al. |
| 5,683,217 | A | 11/1997 | Walther et al. |
| 6,206,737 | B1 | 3/2001 | Bonilla et al. |
| 6,302,629 | B1 | 10/2001 | Hsiao |
| 6,334,748 | B1 | 1/2002 | Gudjonsson |
| 6,908,270 | B1 | 6/2005 | Iwata |
| 7,014,406 | B2 | 3/2006 | Robertson |
| 7,597,516 | B2 * | 10/2009 | Bucciferro et al. ........... 411/187 |
| 2006/0257229 | A1 * | 11/2006 | Bucciferro et al. ........... 411/187 |
| 2007/0024020 | A1 | 2/2007 | Orford |

FOREIGN PATENT DOCUMENTS

| | | |
|---|---|---|
| DE | 4121061 | 1/1993 |
| GB | 152885 | 10/1920 |
| JP | 87-196917 | 12/1987 |
| JP | 2005-045218 | 6/1993 |
| JP | 07-217634 | 8/1995 |
| JP | 9317746 | 9/1997 |
| JP | 2003021123 | 1/2003 |
| JP | 2005-114061 | 4/2005 |

OTHER PUBLICATIONS

Office Action for U.S. Appl. No. 12/561,931 dated Dec. 14, 2011.
Notice of Allowance dated Aug. 12, 2013 in U.S. Appl. No. 12/713,348.
Office Action dated Apr. 22, 2013 in U.S. Appl. No. 12/713,348.
Advisory Action dated Sep. 5, 2012 in U.S. Appl. No. 12/713,348.
Final Office Action dated Jul. 23, 2012 in U.S. Appl. No. 12/713,348.
Office Action dated Mar. 13, 2012 in U.S. Appl. No. 12/713,348.
Advisory Action dated Mar. 7, 2011 in U.S. Appl. No. 12/713,348.
Final Office Action dated Nov. 9, 2010 in U.S. Appl. No. 12/713,348.
Office Action dated Jul. 29, 2010 in U.S. Appl. No. 12/713,348.
International Preliminary Report on Patentability dated Apr. 23, 2012 in Application No. PCT/CA2010/000658.
International Search Report and Written Opinion dated Nov. 22, 2010 in Application No. PCT/CA2010/000658.
Office Action dated Dec. 14, 2011 in U.S. Appl. No. 12/561,931.

* cited by examiner

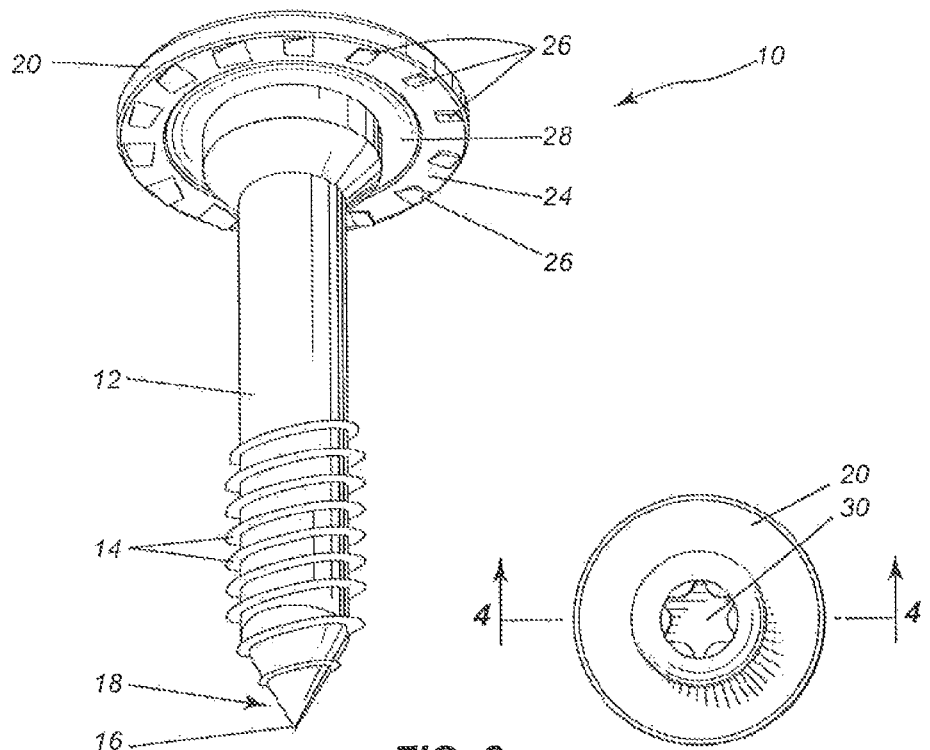
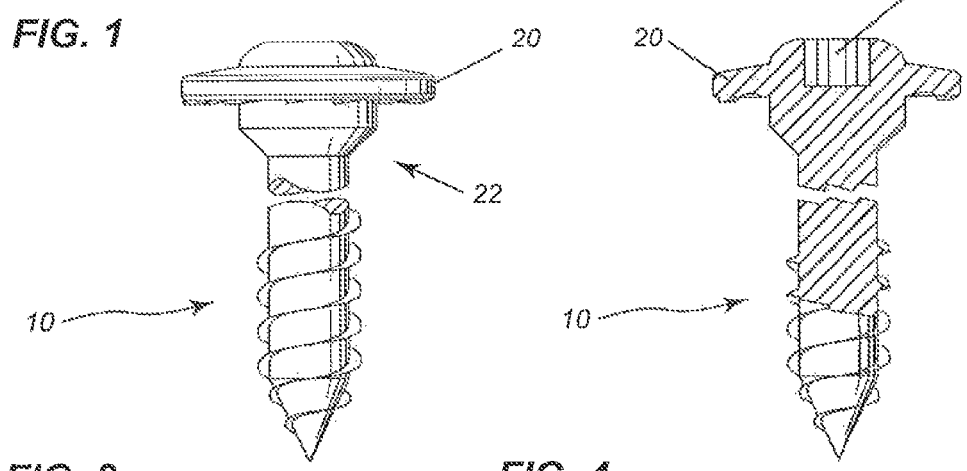
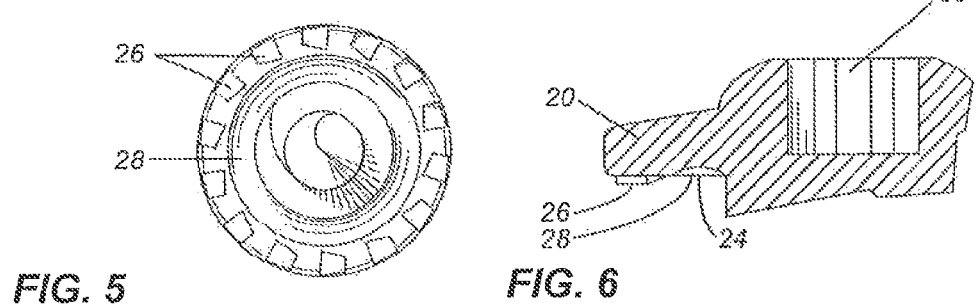
FIG. 1
FIG. 2
FIG. 3
FIG. 4
FIG. 5
FIG. 6

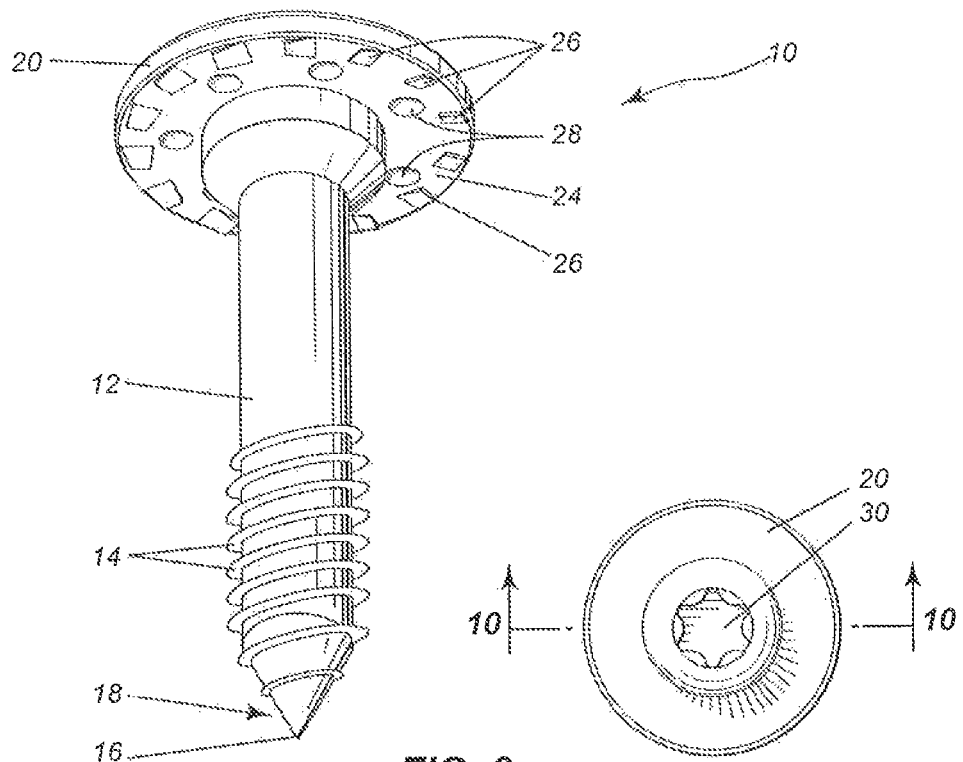
FIG. 7
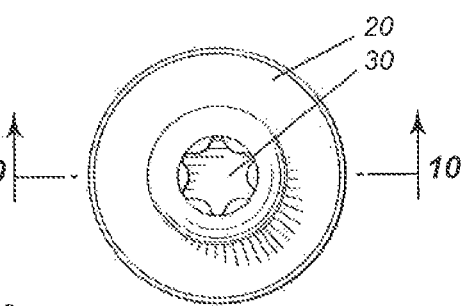
FIG. 8
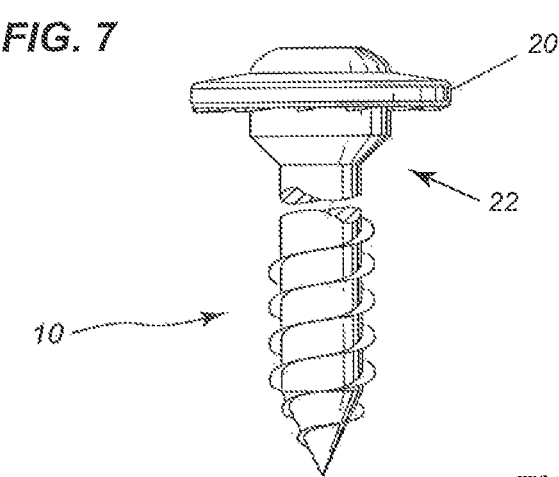
FIG. 9
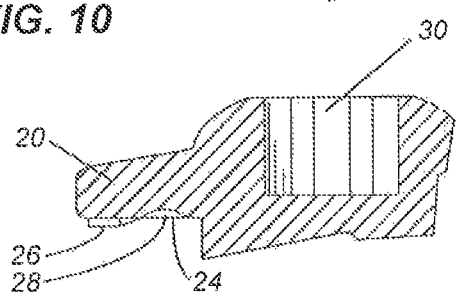
FIG. 10
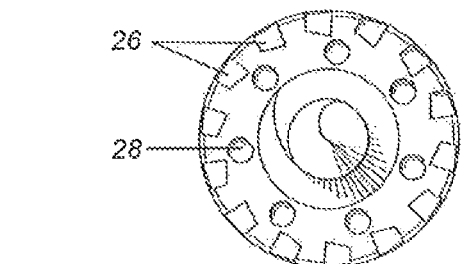
FIG. 11
FIG. 12

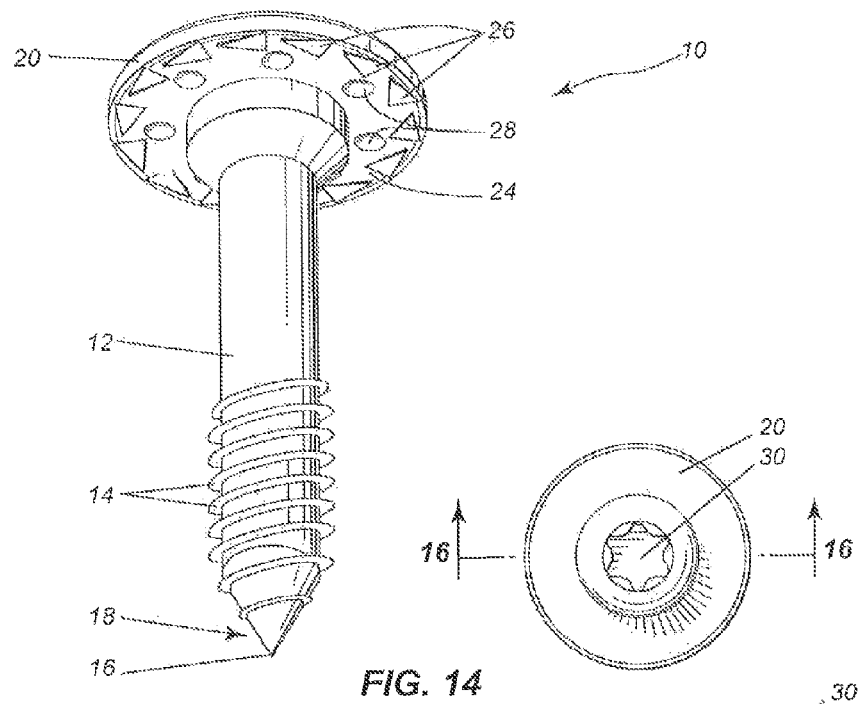
FIG. 13  FIG. 14
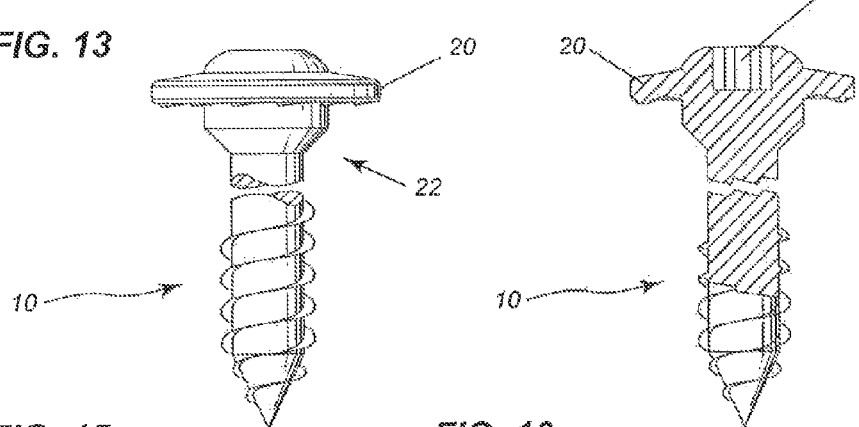
FIG. 15  FIG. 16
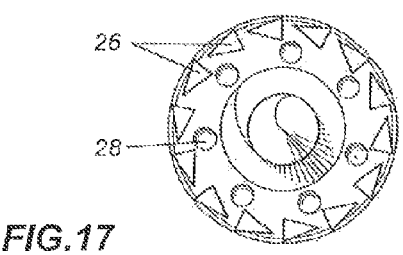
FIG. 17
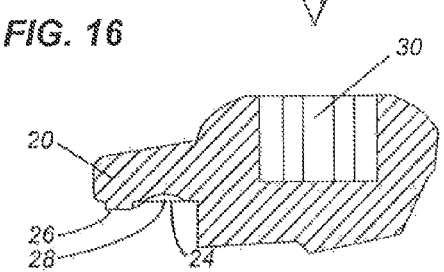
FIG. 18

SCREW HAVING UNDERSIDE CUTTERS AND POCKETS

CROSS-REFERENCE TO RELATED APPLICATIONS

This application is a divisional of, and claims priority to, U.S. Ser. No. 12/561,931, entitled "SCREW HAVING UNDERSIDE CUTTERS AND POCKETS" filed on Sep. 17, 2009, the entire contents of which is hereby incorporated by reference in its entirety.

TECHNICAL FIELD

The present invention relates generally to threaded fasteners and, in particular, to screws having generally flat heads.

BACKGROUND

A self-countersinking screw for fibrous material such as wood, wood-like materials and composite materials is disclosed in Applicant's own Canadian Patent 2,198,232 (Walther et al.) which issued Apr. 16, 2002. This self countersinking screw includes an inverted-conical head portion with a cavity adapted to receive a tip of a screwdriver and having a conical bottom having a plurality of triangular recesses each having a lateral side extending inwardly to form a sharp edge and a space for receiving chips. The sharp edge is designed to create a countersink when the screw penetrates into the workpiece. This self-countersinking screw can be inserted easily and efficiently.

One persistent problem with wood screws (or screws for any other fibrous material) is that they have a propensity to loosen over time. It would thus be highly desirable to provide an improved screw for fibrous material that not only is self-countersinking but is also less prone to loosening.

SUMMARY

In broad terms, the present invention provides a novel screw having cutters and one or more pockets on an underside of the screw head. When the screw is inserted, the cutters scrape or carve off material from the surface of the workpiece against which the head of the screw bears to thereby countersink the head. The one or pockets receive material from the workpiece into which the screw is being inserted to thereby lock the screw in place. The material that enters the pockets prevents the screw from loosening.

Accordingly, one main aspect of the present invention is a screw comprising an elongated shank having a plurality of threads over at least a portion of the shank, the threads terminating in a tip at a first end of the shank. The screw has a head disposed at a second end of the shank, the head having a substantially flat underside. A plurality of cutters are arranged circumferentially on the underside of the head. The cutters are adapted to facilitate countersinking of the head by cutting away material from a surface of a fibrous material into which the screw is being inserted. At least one pocket is spaced radially apart from the cutters for receiving at least some of the fibrous material when the screw is inserted into the fibrous material.

Another main aspect of the present invention is a method of fastening a screw to a piece of fibrous material. The method entails positioning a tip of the screw against a surface of the fibrous material and applying torque to the screw to cause the screw to thread into the fibrous material until cutters on an underside of a head of the screw cut away some of the fibrous material from the surface to thereby facilitate countersinking of the head of the screw into the surface of the fibrous material. The torque is applied until some of the fibrous material enters one or more pockets formed in the underside of the head of the screw.

Yet a further main aspect of the present invention is a threaded fastener including a shank and a head at one end of the shank. The head has an underside in which are disposed a plurality of cutters for countersinking the head into a surface of fibrous material. The head further includes at least one pocket disposed around the shank and disposed radially inwardly from the cutters to receive some of the fibrous material when the fastener is inserted.

BRIEF DESCRIPTION OF THE DRAWINGS

Further features and advantages of the present invention will become apparent from the following detailed description, taken in combination with the appended drawings, in which:

FIG. 1 is an isometric view of the underside of the head of a novel screw in accordance with a first embodiment of the present invention;

FIG. 2 is a top plan view of the screw of FIG. 1;

FIG. 3 is a side elevation view of the screw of FIG. 1;

FIG. 4 is a cross-sectional view of the screw of FIG. 1, taken through section 4-4;

FIG. 5 is a bottom plan view of the screw of FIG. 1;

FIG. 6 is an enlarged cross-sectional view of a portion of the screw of FIG. 1;

FIG. 7 is an isometric view of the underside of the head of a novel screw in accordance with a second embodiment of the present invention;

FIG. 8 is a top plan view of the screw of FIG. 7;

FIG. 9 is a side elevation view of the screw of FIG. 7;

FIG. 10 is a cross-sectional view of the screw of FIG. 7, taken through section 10-10;

FIG. 11 is a bottom plan view of the screw of FIG. 7;

FIG. 12 is an enlarged cross-sectional view of a portion of the screw of FIG. 7;

FIG. 13 is an isometric view of the underside of the head of a novel screw in accordance with a third embodiment of the present invention;

FIG. 14 is a top plan view of the screw of FIG. 13;

FIG. 15 is a side elevation view of the screw of FIG. 13;

FIG. 16 is a cross-sectional view of the screw of FIG. 13, taken through section 16-16;

FIG. 17 is a bottom plan view of the screw of FIG. 13; and

FIG. 18 is an enlarged cross-sectional view of a portion of the screw of FIG. 13.

It will be noted that throughout the appended drawings, like features are identified by like reference numerals. It should furthermore be noted that the drawings are not necessarily to scale.

DETAILED DESCRIPTION

In general, and by way of introduction, the present invention provides a novel screw having cutters and one or more pockets on an underside of the head of the screw. When the head bears against a surface, the cutters scrape or carve off material from the surface to help countersink the head. The pockets receive material from the workpiece into which the screw is penetrating to thereby lock the screw in place, i.e. the material extending into the pockets precludes, or at least inhibits, the screws from loosening over time.

FIGS. 1-18 depict three embodiments of the present invention which are presented by way of example to illustrate the invention. FIGS. 1-6 depict a first embodiment of the present invention in which the screw has a plurality of cutters shaped like quadrilateral wedges and a single annular pocket disposed around the shank of the screw. FIGS. 7-12 depict a second embodiment of the present invention in which the screw has a plurality of circular pockets in the underside of the head. FIGS. 13-18 depict a third embodiment of the present invention in which the cutters are triangular wedges.

As shown in FIGS. 1-6, a screw generally designated by reference numeral 10 has an elongated shank 12 having a plurality of threads 14 over at least a portion of the shank, the threads terminating in a tip 16 at a first end 18 of the shank. In other words, the shank (stem) may have a threaded portion and a non-threaded portion. The screw also has a head 20 disposed at a second end 22 of the shank. The head has a substantially flat underside 24. Between the shank and the head may be a tapered (frusta-conical) intermediate (neck) portion as shown in the figures.

A plurality of cutters (cutting teeth) 26 are arranged circumferentially on the underside of the head. The cutters have a sharp cutting edge that are oriented and otherwise adapted to cut away (i.e. carve off or scrape off) fibrous material (e.g. wood, composites and like products) when rotated against a surface of this type of fibrous material. The cutters thereby facilitate countersinking of the head. The cutters may incidentally also produce debris or chips when rotated against the surface.

At least one pocket 28 is spaced radially apart from the cutters for receiving some of the fibrous material when the screw penetrates into the material. The pocket may be any suitable recess, hole or cavity for receiving material. In some cases, shards, protrusions or other elements of the fibrous material may extend or enter into the pockets. As the screw is rotated these help lock the screw. In other cases, depending on the nature of the fibrous material in question, it is possible that some of the fibrous material at the surface may partially extrude into the pockets. In addition, is also believed that possibly some debris (that is generated when the cutters rotate against the surface) will be collected in these pockets. Debris may help pack the fibrous material into the pockets to further secure the screw against unwanted loosening.

The pocket in this first embodiment is an annular recess (annular pocket) that surrounds the shank (stem) and is disposed radially inwardly of the cutters. In the particular embodiment depicted in FIGS. 1-6, the cutters 26 are quadrilateral wedges. In one specific embodiment, there are fourteen (14) cutters although the number of cutters 26, it should be appreciated may be varied. The screw also comprises a socket 30 into which a correspondingly shaped bit of a screwdriver may be inserted to apply torque to rotate the screw. One example of a socket is depicted in the drawings; however, it should be appreciated that any type of socket may be utilized with the embodiments of this invention.

In the second embodiment depicted in FIGS. 7-12, the screw 10 has a plurality of discrete pockets 28 instead of an annular recess (annular pocket). The pockets 28 may be circular as illustrated in this second embodiment. It will be appreciated that the discrete pockets 28 may be square, rectangular, oblong, elliptical or any other suitable shape for receiving fibrous material and/or for incidentally collecting and storing debris.

In the third embodiment depicted in FIGS. 13-18, the screw has cutters 26 shape& like triangular wedges while the circular pockets 26 are the same as those shown in the second embodiment. It will be appreciated that any other suitable cutting shape may be utilized in lieu of the quadrilateral and triangular wedges depicted herein. Any suitable shape can be employed for the cutters provided they retain their function, i.e. the ability to easily and cleanly cut a countersink hole. Likewise, as noted above, the pockets may have any suitable shape provided they are able to receive some of the material as the screw penetrates into the surface of the workpiece. By receiving some of the material into the pockets, the screw is less likely to loosen over time.

The screw described above and depicted in the attached drawings is designed primarily to be used with a fibrous material, e.g. wood, composites and other lignocellulosic materials. The embodiments of this invention may potentially be applied to other types of fasteners and materials where the cutters countersink and the pockets receive material that locks the screw against unwanted loosening. Accordingly, the present invention can be adapted to provide a fastener having a shank (or stem) and a head at one end of the shank, the head having an underside in which are disposed a plurality of cutters for countersinking and at least one pocket disposed around the shank and disposed radially inwardly from the cutters to receive material when the fastener is inserted. While the primary intention is to apply this technology to a screw, it could be applied in theory to other types threaded fasteners.

The present invention has been described in terms of specific embodiments, examples, implementations and configurations which are intended to be exemplary or illustrative only. Other variants, modifications, refinements and applications of this innovative technology will become readily apparent to those of ordinary skill in the art who have had the benefit of reading this disclosure. Such variants, modifications, refinements and applications fall within the ambit and scope of the present invention. Accordingly, the scope of the exclusive right sought by the Applicant for the present invention is intended to be limited solely by the appended claims and their legal equivalents.

The invention claimed is:

1. A screw comprising:
    an elongated shank having a plurality of threads over at least a portion of the shank, the threads terminating in a tip at a first end of the shank;
    a head disposed at a second end of the shank, the head having a substantially flat underside;
    a plurality of cutters arranged circumferentially on the underside of the head, the cutters being adapted to facilitate countersinking of the head by cutting away material from a surface of a fibrous material into which the screw is being inserted; and
    a plurality of pockets extending into the underside of the head, the pockets being spaced radially inwardly and apart from the cutters such that a portion of the substantially flat underside extends radially between the pockets and the cutters, the pockets receiving at least some of the fibrous material when the screw is inserted into the fibrous material.

2. The screw as claimed in claim 1 wherein the pockets are disposed circumferentially around the shank and positioned radially inwardly of the cutters.

3. The screw as claimed in claim 1 wherein a number of cutters exceeds a number of pockets.

4. The screw as claimed in claim 1 wherein the cutters are quadrilateral wedges.

5. The screw as claimed in claim 1 wherein the cutters are triangular wedges.

6. The screw as claimed in claim 1 wherein the pockets are circular.

7. A threaded fastener comprising:
a shank; and
a head at one end of the shank, the head having a substantially flat underside from which protrude a plurality of cutters for countersinking the head into a surface of fibrous material, the head further including a plurality of pockets extending into the head and which are disposed around the shank and disposed radially inwardly from the cutters to receive some of the fibrous material when the fastener is inserted, wherein the pockets are spaced radially apart from the cutters such that a portion of the substantially flat underside extends radially between the pockets and the cutters.

8. The fastener as claimed in claim 7 comprising a plurality of triangular wedge-shaped cutters.

9. The fastener as claimed in claim 7 comprising a plurality of quadrilateral wedge-shaped cutters.

10. The fastener as claimed in claim 7 wherein the pockets are disposed circumferentially around the shank.

11. The fastener as claimed in claim 7 wherein a number of cutters exceeds a number of pockets.

12. The fastener as claimed in claim 7 wherein the pockets are circular.

\* \* \* \* \*